United States Patent [19]

Moore et al.

[11] 4,012,532

[45] Mar. 15, 1977

[54] METHOD FOR CONDITIONING FOOD STRANDS

[75] Inventors: Marvi D. Moore, Dallas; David P. Fowler, Irving, both of Tex.

[73] Assignee: Frito-Lay, Inc., Dallas, Tex.

[22] Filed: Dec. 13, 1972

[21] Appl. No.: 314,600

[52] U.S. Cl. .............................. 426/451; 426/621; 426/637; 34/107; 34/156

[51] Int. Cl.² ........................................ A23L 1/16

[58] Field of Search ........... 426/158, 451, 621, 637

[56] References Cited
UNITED STATES PATENTS

| | | | |
|---|---|---|---|
| 1,676,474 | 7/1928 | Broughton | 426/451 |
| 2,669,195 | 2/1954 | Pellegrino | 426/451 |
| 3,252,805 | 5/1966 | Sienkiewicz et al. | 426/451 |
| 3,352,686 | 11/1967 | Mancuso et al. | 426/451 |

*Primary Examiner*—Raymond N. Jones
*Attorney, Agent, or Firm*—Roylance, Abrams, Berdo & Kaul

[57] ABSTRACT

A process for conditioning food strands in which food strands are formed from a dough of food material and each of the strands is passed individually through a separate zone of positive air pressure.

7 Claims, 11 Drawing Figures

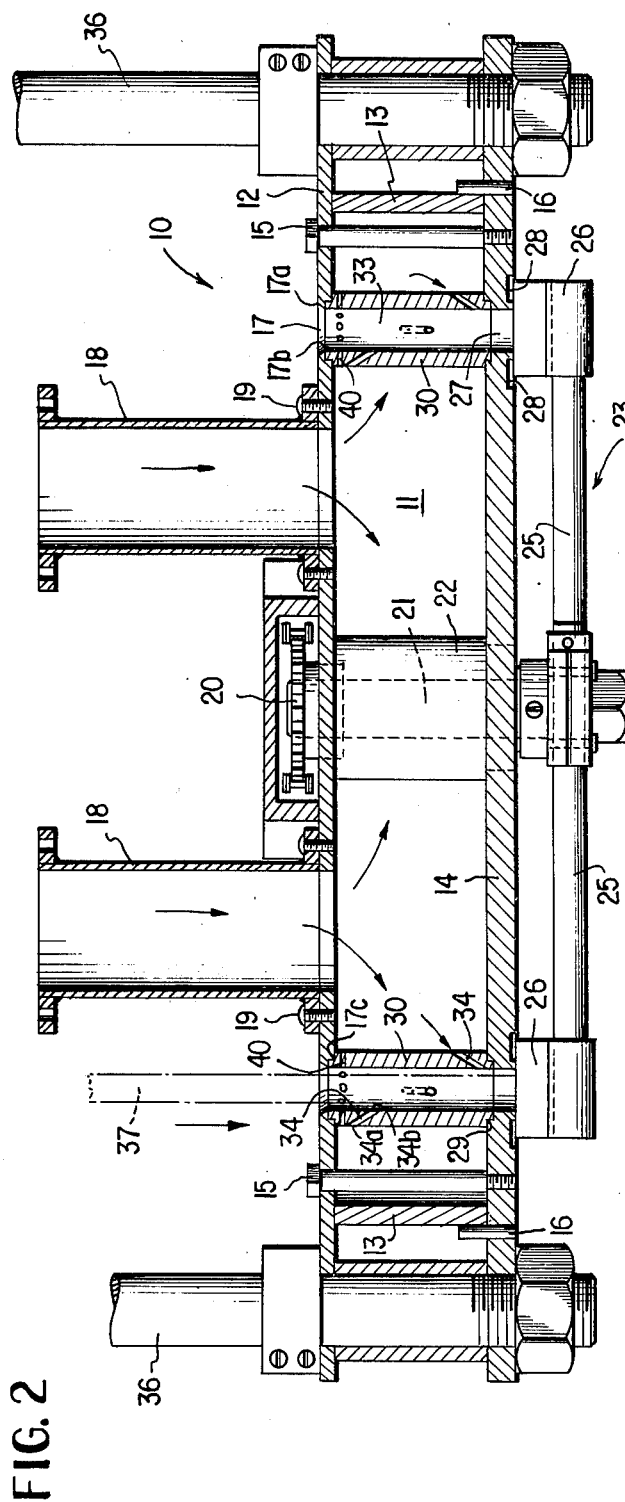
FIG. 2
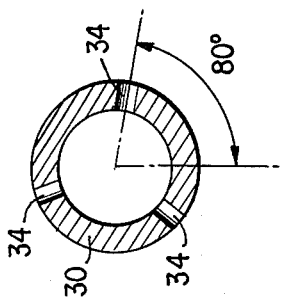
FIG. 6
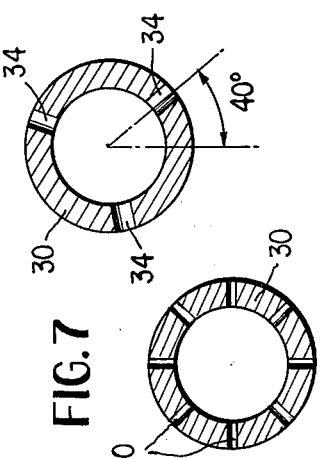
FIG. 5
FIG. 7
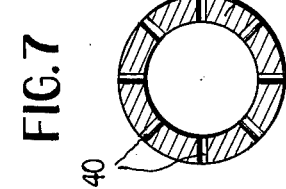
FIG. 3
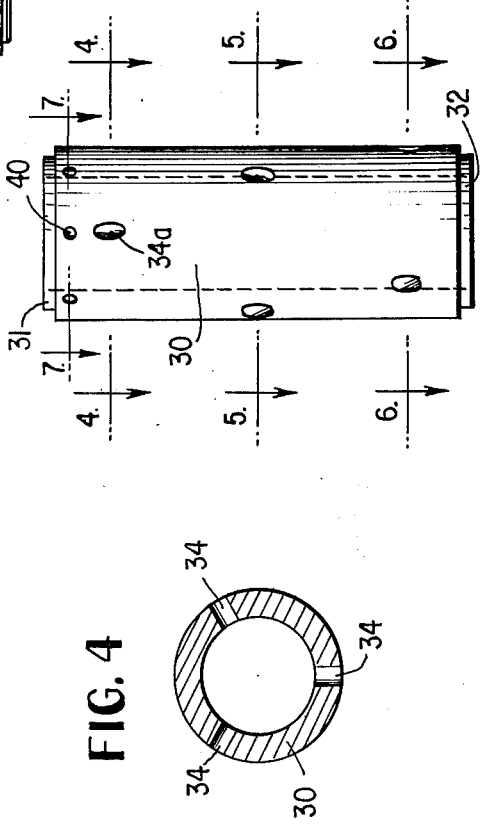
FIG. 4

METHOD FOR CONDITIONING FOOD STRANDS

This invention relates to a process and apparatus for conditioning food strands. More particularly, this invention relates to the individual conditioning of food strands comprising starch containing material.

There are many known processes for producing various types of food products by extruding a dough comprising a starchy material into a strand. For example, macaroni has been made by extruding macaroni dough into strands of given lengths and hanging these strands in a drying chamber for a period of time sufficient to dry the macaroni to a moisture content of about 11 to 12%. It has also been proposed to extrude the dough directly through a cutter head where rotating knives cut off the tubular material into appropriate lengths. However, the action of cutting tends to draw the ends of the tube together and deform them. Therefore, it is generally desirable to condition the food strands before cutting them — i.e., to cool and/or partially dry them to render them more firm.

U.S. Pat. No. 1,676,474 discloses a method and apparatus for drying macaroni by applying heat to the interior of macaroni pieces so that drying of the pieces progresses from the interior outwardly. The macaroni strands are forced out of a plurality of extruding dies and onto individual drying elements. U.S. Pat. No. 2,669,195 discloses a method for making macaroni which comprises extruding dough through a die to form a plurality of strands, passing the strands from the die through a substantial distance to a cutting head and subjecting the strands to a blast of cooling and drying air during the passage of the strands from the die to the cutting head.

It is an object of this invention to provide a process for conditioning extruded food strands of a starchy material.

It is a further object of this invention to provide such a process which will not result in deformation of the food strands.

Another object of this invention is to provide an apparatus capable of accomplishing such processes.

In accordance with the process of this invention, one or more food strands are formed from a dough of food material. Each of the strands is then passed individually through a separate zone of positive air pressure. The apparatus for accomplishing this process comprises a plenum means and a means for introducing air under pressure into said plenum means. A plurality of elongated hollow members pass through the plenum means. Each of the elongated hollow members is adapted to permit entry of a food strand at one end and exit at the other end. Each of the elongated hollow members contains at least one orifice to permit air to pass from the plenum means into the elongated hollow member.

This invention will be more particularly defined with reference to the accompanying drawings in which:

FIG. 2 is a sectional view taken on line 2—2 of FIG. 1.

FIG. 3 is an enlarged elevational view of a component of a conditioning chamber.

FIG. 4 is a sectional view taken on line 4—4 of FIG. 3.

FIG. 5 is a sectional view taken on line 5—5 of FIG. 3.

FIG. 6 is a sectional view taken on line 6—6 of FIG. 3.

FIG. 7 is a sectional view taken on line 7—7 of FIG. 3.

The material used to prepare the food strands in the process of this invention is preferably a starchy or farinaceous material. The dough may be formed from the starchy material, e.g., by adding moisture to a meal or flour derived from corn, wheat, rice, oats, barley, potatoes, tapioca, etc. The dough may be prepared by techniques well known in the art. Thus, the dough may be prepared by mixing a liquid such as water with dry starchy material, by reducing the particle size of raw potatoes to form a mixture of finely divided solids and liquids and thereafter treating the mixture in such a way as to increase the viscosity thereof such as described in U.S. Pat. Nos. 3,109,739 and 3,230,094, or by other suitable means. The dough should contain enough liquid so that it may be extruded, e.g., from about 20 to 55% by weight moisture.

The dough may be extruded into one or more strands by means of a conventional extruder. During passage of the dough through the extruder, it may be subjected to elevated temperatures which will gelatinize starch contained in the dough. In a preferred embodiment of this invention in order to achieve maximum production from each extruder, the dough is extruded into a plurality of strands through a die in the extruder head containing a plurality of orifices. Each strand is then individually conditioned as hereinafter described. In the most preferred embodiment of this invention, the dough is extruded into a plurality of hollow strands. This is accomplished by providing the extrusion head with a plurality of orifices, each orifice containing an insert such as shown in U.S. Pat. No. 3,615,675. Each strand is then passed to one or more elongated conditioning zones wherein it is subjected to a positive air pressure.

Figure 1:
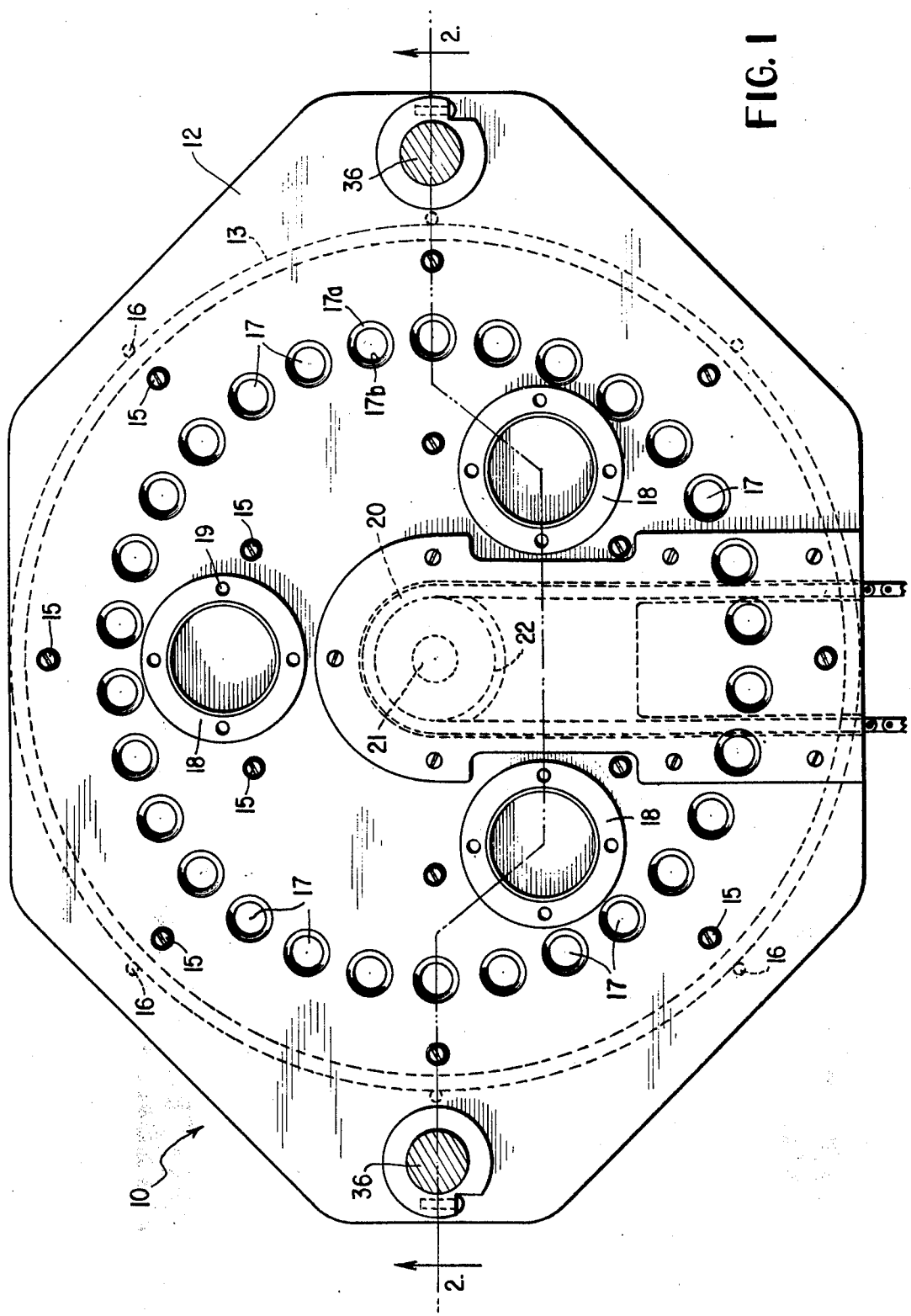
FIG. 1 is a top plan view of a conditioner of the present invention.

Referring to FIGS. 1, 2 and 7, it will be seen that the conditioning apparatus used for conditioning the food strands includes a housing 10 containing a plenum chamber 11. The plenum 11 is bounded by an upper plate 12, a circular wall 13 and a bottom plate 14. The upper plate 12 and the bottom plate 14 are secured to each other by means of bolts 15 and the plenum wall 13 is held in position by means of positioning pins 16.

The upper plate 12 contains a plurality of annular apertures 17 which are evenly spaced in a circle around the upper plate. Each aperture 17 tapers inwardly from the top portion 17a to the bottom 17b. On the bottom of the upper plate 12, beneath each aperture 17 and adjacent to the bottom portion 17b is a countersink 17c which surrounds the aperture. One or more air ducts 18 are secured to the top of the upper plate 12 by bolts 19.

Also secured to the top of the upper plate 12 is a drive means 20 for imparting rotary movement to a drive shaft 21 located within the bearing 22. The drive shaft 21 connects with a rotary knife 23 located on the bottom of the housing 10. The rotary knife 23 comprises a plate 24 secured to the drive shaft 21. Horizontal arms 25 extend horizontally from the plate 24. At the outer end of each arm 25 is located a flat knife blade 26 positioned so as to contact or be in close proximity to the lower portion of the annular apertures 27 in the bottom plate 14.

The annular apertures 27 in the bottom plate 14 are evenly spaced in a circle around the bottom plate in the same pattern and in direct alignment with the annular apertures 17 in the upper plate 12. The circle of annular apertures 27 is bounded on the bottom portion of bottom plate 14 by annular grooves 28. On the top portion of the bottom plate 14, at the top of each annular aperture 27 is a countersink 29 which surrounds the aperture.

The plenum 11 contains a plurality of cylindrically shaped hollow sleeves 30. Each sleeve contains a top flange 31 and a bottom flange 32. The top flange 31 mates with countersink 17c and the bottom flange 32 mates with countersink 29 so that the bore 33 of each sleeve 30 is aligned with and coextensive with the bottom portions 17b of apertures 17 and apertures 27. Each sleeve 30 has therein a plurality of air channels 34 which slope downwardly from the outer orifice 34a to the inner orifice 34b. Each sleeve 30 also has a plurality of air channels 40 which extend radially from the plenum 11 to bore 33 of said sleeve 30. The apertures 17, sleeves 30 and apertures 27 define a plurality of elongated hollow members or conditioning chambers.

In the embodiments shown in FIGS. 3–7, there are three sets of air channels 34, each set having three air channels spaced equidistant to one another on the same horizontal plane. One set of air channels 34 is near the top of the sleeve 30, one set is at about the middle of the sleeve 30 and one set is near the bottom of the sleeve 30. As shown in FIGS. 5 and 6, the air channels in the middle set are offset from the air channels in the upper set by 40° and the air channels in the lower set are offset from the air channels in the upper set by 80°.

Figure 9:
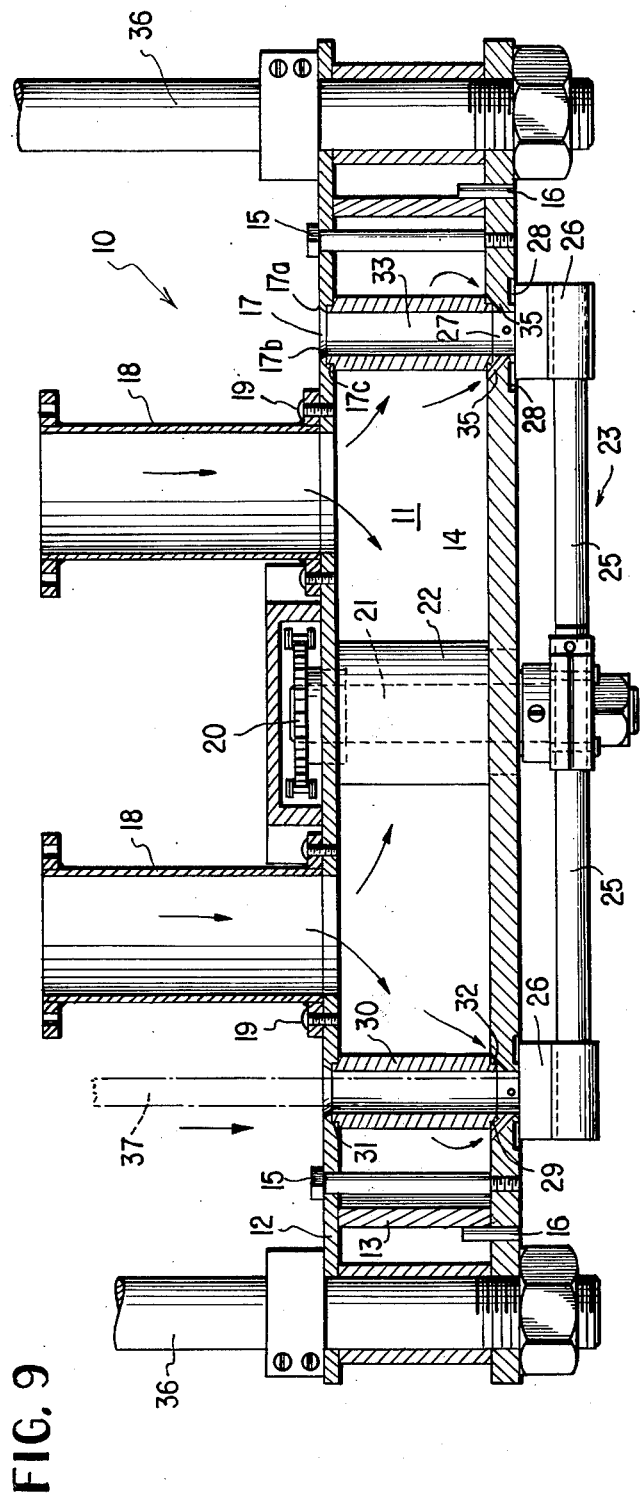
FIGS. 9–11 show an alternative type of conditioning chamber.
Figure 11:
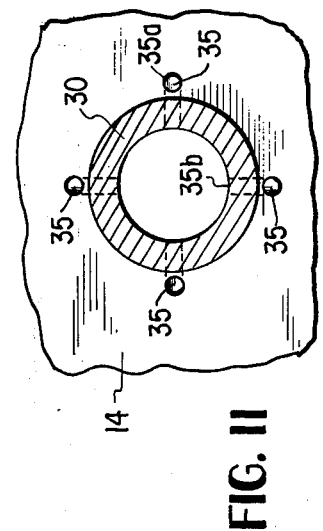
Figure 10:
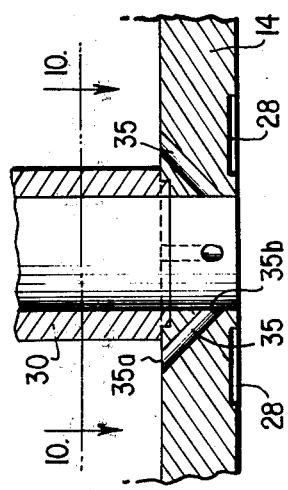

Another embodiment of the conditioning chambers of this invention is shown in FIGS. 9 to 11. In that embodiment, each annular aperture 27 has therein a plurality of air channels 35, which slope downwardly from the upper orifice 35a to the lower orifice 35b. In the embodiment shown in FIG. 11, there are four air channels spaced equidistant to one another.

The housing 10 is positioned beneath and spaced apart from an extrusion head containing a plurality of extrusion orifices so that the extrusion orifices are aligned with apertures 17 and is secured by means of members 36. Since the extrusion orifices are in registration with the apertures 17, extruded food strands 37 will pass through the apertures 17. The housing 10 is situated so that the conditioning chambers are perpendicular to ground level.

The plenum 11 is in communication with a blower system, not shown, by means of air ducts 18. Conditioned air is forced into the plenum 11 through the ducts 18 from the blower system so that a positive air pressure exists in the plenum 11 — i.e., the air in the plenum 11 is under greater pressure than the air outside the plenum. The conditioned air has been treated to adjust the humidity and temperature to a predetermined level which is usually lower than the ambient humidity and temperature. The air channels 34 and 35 connect the plenum 11 with the interior of the conditioning chambers, thereby providing a directed air flow in the interior of the conditioning chambers.

Returning to the description of the process of this invention, food strands are extruded through a plurality of orifices in an extrusion head and each strand drops a finite distance into a conditioning chamber located below the extrusion orifice as previously described.

Figure 8:
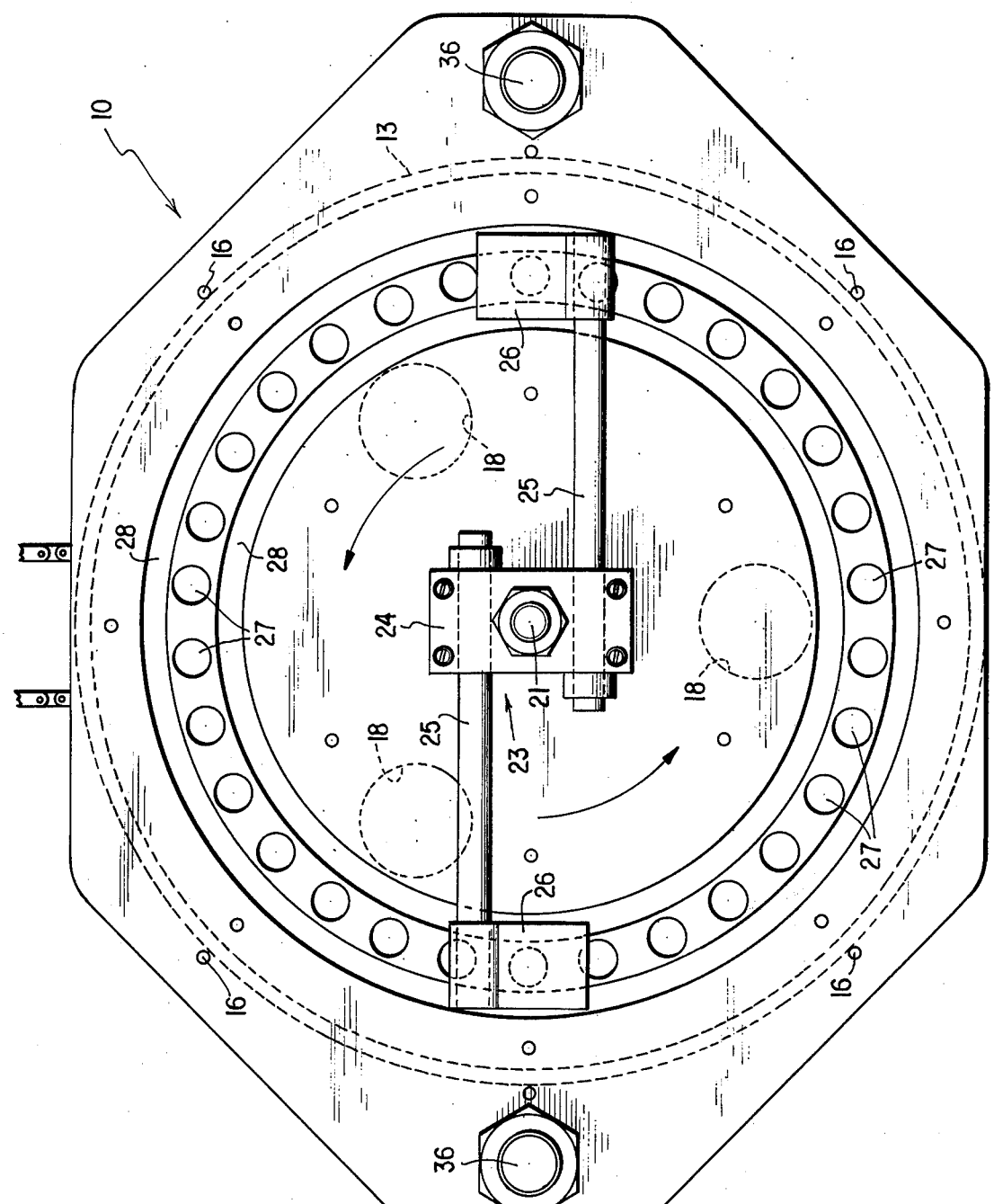
FIG. 8 is a bottom plan view of the conditioner.

Each food strand 37 passes through a separate conditioning chamber so that each strand is individually conditioned. As a food strand passes through the conditioning chamber shown in FIG. 2, conditioned air is vented downward through the air channels 34 along the strand and conditioned air is vented horizontally into the bore 33 through the channels 40. In the conditioning chamber of FIG. 8, air is vented through the air channels 35, causing air to be pulled in through apertures 17 and down along the food strand 36. This downward flow of air keeps the strand centered in the conditioning chamber, imparts a downward force on the strand and prevents the strand from sticking to the wall of the conditioning chamber. The directed air flow completely surrounds the strand while it is in the conditioning chamber. The downward flow of air creates a negative pressure in the upper portion of the conditioning chamber and a positive pressure in the lower portion of the chamber.

Conditioned air entering the bore 33 through the channels 40 acts as a sort of air curtain which supplies a substantial portion of the quantity of conditioned air that is required by the negative pressure created by the downward flow of air in the conditioning chambers, thus excluding the introduction of substantial quantities of unconditioned air from the atmosphere through the apertures 17. This curtain of air further aids in keeping the food strands centered in the conditioning chambers and prevents them from sticking to the walls of the conditioning chambers.

Means other than those exemplified in FIGS. 2–7 and FIGS. 8–10 may be employed to create a directed air flow and resultant zone of positive air pressure in the conditioning chamber.

When the dough strand emerges from the aperture 27 it is cut into pieces of the desired length by the rotating knife 23. The length of the pieces may be regulated by adjusting the speed of the knife. When the knife blade 26 passes over the aperture 27, the strand is momentarily pushed against the side of the channel 27. After the knife has passed over the aperture 27, the positive air pressure in the conditioning chamber immediately pushes the strand away from the wall and recenters the strand in the aperture 27.

The positive air pressure or pneumatic condition in the conditioning chamber provides several additional advantages. It cools and partially dries the strand, thereby rendering it more firm and enabling it to be cut without sticking to the cutting mechanism and without deformation of the cut ends. The individual conditioning of each strand permits greater control in providing uniformity of the conditioning operation. When substantial portions of non-conditioned air are excluded from the conditioning chambers, as in the embodiment exemplified in FIGS. 2–7, most of the air which comes in contact with the dough strands is of a constant predetermined temperature and humidity, thus enabling the dough strands to be uniformly cooled and dried regardless of the temperature and humidity conditions which exist outside the conditioner.

After the food strands have been cut into pieces, the pieces may be further processed by conventional techniques. For example, if the desired product is to be used as a snack item, the pieces may be baked or fried in deep fat to provide a puffed product.

The following examples illustrate the process of this invention:

EXAMPLE I

A dough is formed from corn meal having a moisture content of about 40%. The dough is extruded through a die containing a plurality of orifices disposed in an annular pattern around the die face. Each extruded strand free falls vertically several inches into a mating conditioning chamber as previously described. In the conditioning chamber, air is vented downward by means of channels in the sides of the conditioning chambers along the strand to cool and set the corn meal dough. When each strand passes out of the conditioning chamber, it is cut into pieces by a rotary knife. The pieces do not stick to the side of the orifice at the exit point from the conditioning chamber, the ends remain open through the cutting operation and the cut pieces are firm enough to maintain their shape. The pieces are then oven dried to a moisture content of about 11%. The pieces are then fried in hot cooking oil. During frying, the pieces expand to form puffed chips.

EXAMPLE II

A potato dough is prepared from potato flour having a moisture content of about 50%. The dough is extruded into a plurality of hollow strands as described in Example I except that each orifice in the die contains an insert so that the dough is extruded into a tube around the insert. Each tube is conditioned as described in Example I and cut into pieces. The pieces are dried to a moisture content of about 8% and are deep fat fried. During frying, the pieces expand to form a puffed hollow snack product having a potato flavor.

There are many variations to the specific embodiments shown which are within the scope of the present invention. Therefore, the invention is not limited to the embodiment shown, but encompasses numerous modifications. For example, the conditioning apparatus need not necessarily be used in combination with a rotary knife as described herein.

We claim:

1. A process for conditioning strands of food material which comprises forming a dough of said food material, forming said dough into a plurality of strands, passing each said strand individually through a separate elongated, vertical zone of positive air pressure, all of said elongated, vertical zones being located in a larger zone of positive air pressure, the air in said larger zone being under greater pressure than the air outside of said larger zone, and thereafter cutting the said strands into pieces.

2. A process as defined in claim 1 wherein said dough contains a starchy material.

3. A process as defined in claim 2 wherein said dough is continuously formed into at least one strand by extrusion.

4. A process as defined in claim 3 wherein said dough becomes heated during said extrusion sufficiently to gelatinize the starch.

5. A process as defined in claim 1 wherein said strands are hollow.

6. A process as defined in claim 1 wherein each of said plurality of extruded food strands is gravity fed into a separate elongated zone of directed air flow wherein it is subjected to a downward flow of air and wherein it is completely surrounded by said air flow.

7. A process as defined in claim 6 wherein a substantial portion of air in said zone is conditioned air which has been treated to adjust the humidity and temperature to a predetermined level.

* * * * *